Figure 1:
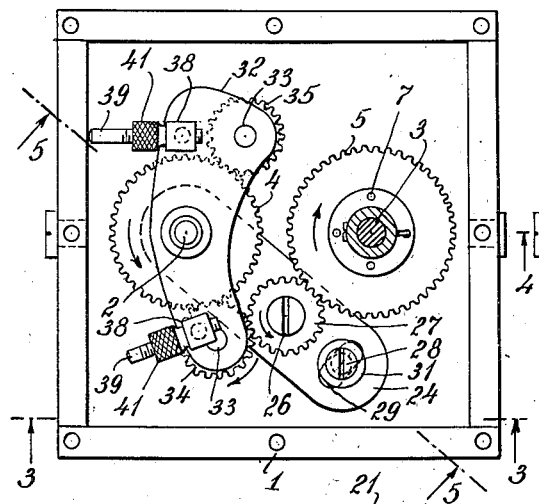

May 2, 1950     W. B. WAIT     2,506,562
GEAR MECHANISM FOR VEHICLE SPEEDOMETERS
Filed Oct. 10, 1945     3 Sheets-Sheet 1

INVENTOR
William Bell Wait
BY
Pennie, Davis, Marvin & Edmonds
ATTORNEYS

May 2, 1950 W. B. WAIT 2,506,562
GEAR MECHANISM FOR VEHICLE SPEEDOMETERS
Filed Oct. 10, 1945 3 Sheets-Sheet 2

INVENTOR
William Bell Wait
BY
Pennie, Davis, Marvin & Edmonds
ATTORNEYS

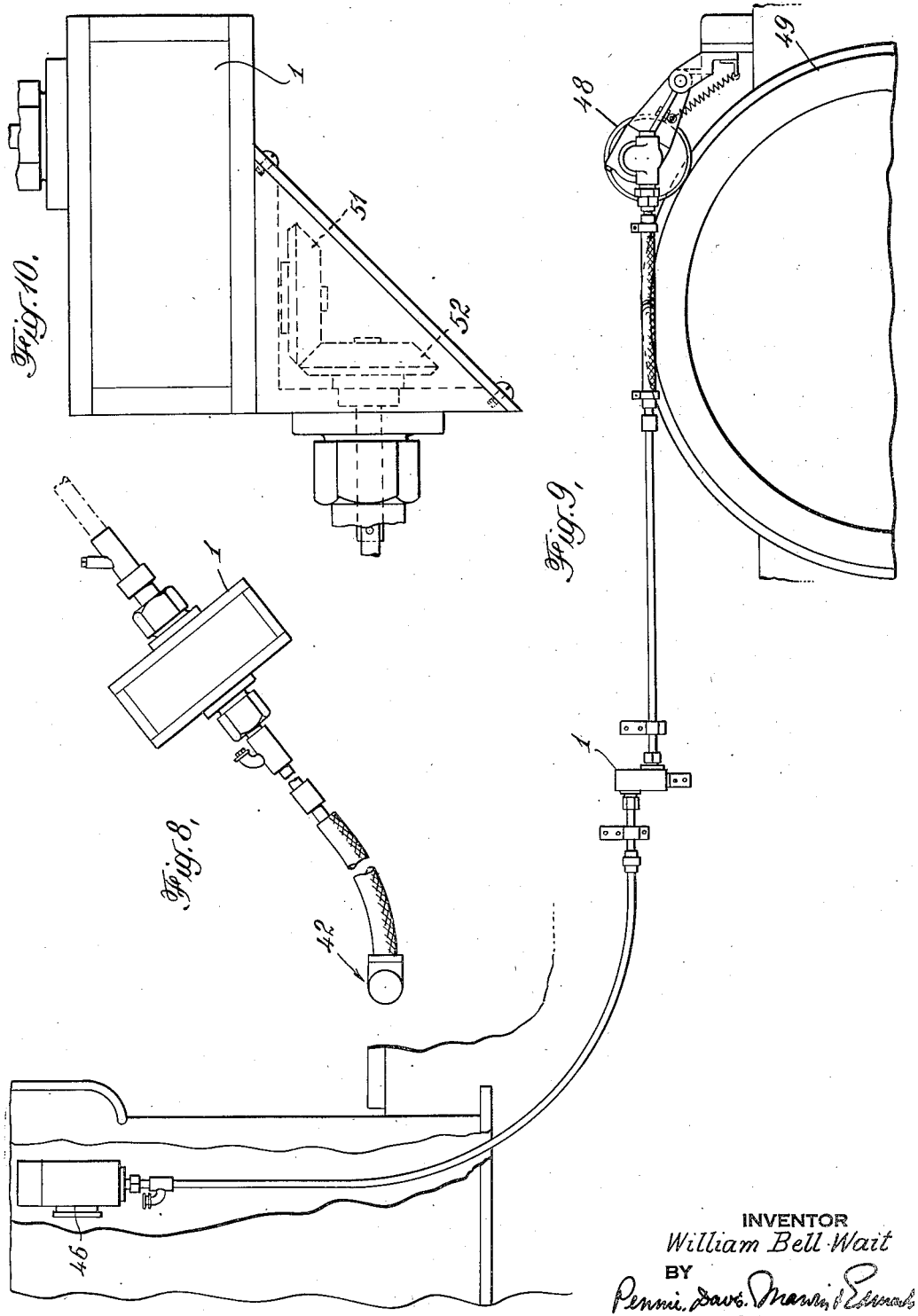

Patented May 2, 1950

2,506,562

UNITED STATES PATENT OFFICE 2,506,562

GEAR MECHANISM FOR VEHICLE SPEEDOMETERS

William Bell Wait, New York, N. Y.; Winthrop Hilton Battles, Arthur R. Brennan, Wm. W. Battles, and William D. Hart, executors of said William B. Wait, deceased Application October 10, 1945, Serial No. 621,475

1 Claim. (Cl. 74—12)

This invention relates to driving mechanism for vehicle speedometers and more particularly to a gear mechanism whereby wheel wear may be compensated for and a unidirectional operation of the instrument and its drive shaft obtained during either direction of vehicle travel. Although my invention is applicable to vehicles generally, it is of particular utility in connection with railroad locomotives.

It is common practice to operate the speedometer of a steam locomotive by a friction drive wheel engaging the tread of one of the locomotive driving wheels and connected to the instrument by means of a flexible shaft in the form of a chain or cable. Such a drive is illustrated in Wallbillich Patent No. 1,634,565, July 5, 1927. As the readings of an instrument driven in this manner are independent of the size of the driving wheel, the wear of the latter—which may amount to as much as 10%—is of no consequence. The only wear that affects the accuracy of the instrument is the wear of the small friction drive wheel, but as this wheel is made of harder steel than the tread of the locomotive driver on which it runs, and may be replaced at small expense, the wear need not exceed 2%. By calibrating the instrument for accuracy at the mean diameter the error is limited to plus or minus 1%, which is close enough for ordinary purposes, although there are occasions when a reduction of even this small error is or may be desirable.

By reason of locomotive construction it is or may be impracticable to use a friction drive on Diesel-electric and electric locomotives. Speedometers on such locomotives are, therefore, usually driven from the axle of a driving wheel or other wheel, through a bevel gear on an extension of the axle meshing with a second bevel gear on the instrument shaft. Because wheels wear and decrease in circumference, an error of as much as 5% or more in the instrument readings may result when using an axle drive, and this error is generally too high to be acceptable. It is, therefore, one of the objects of the present invention to compensate for the effect of wheel wear on the reading of axle-driven instruments—as well as to compensate for the lesser effect of wear of the friction wheel in the case of friction-driven instruments. I have attained this object by means of the gear mechanism of the present invention. This comprises an axially-fixed input spindle actuated by the drive shaft or the axle and an axially-fixed output spindle which operates the instrument, on which spindles input and output gears, respectively, are mounted. One of these gears is removable, so that as the vehicle wheel— or friction drive wheel—wears, its increased revolutions per mile may be compensated for by substituting gears of progressively varying size. If the output gear is the replaceable gear, then each successive gear is slightly larger than its predecessor. As the centers of the input and output drive shafts are fixed, I provide one or two adjustable idlers between the input and output gears, the number of these idlers determining the direction of rotation of the output spindle with respect to the input.

In recording speedometers having a record tape, means have been provided for effecting unidirectional movement of the tape despite reversal of the locomotive, but no provisions have been made to insure unidirectional rotation of the centrifugal governor or the flexible shaft. This is not a matter of serious concern in the case of steam locomotives which run in reverse for short periods only and at low speeds. However, in the case of Diesel-electric and electric locomotives which, like ferry boats, are seldom turned around and run forward and backward with the same facility, frequency and speed, unidirectional rotation of both centrifugal governor and flexible shaft is important. Certain variables must be considered in the operation of a centrifugal governor: mechanical friction, torsion, vibration, and terrestrial rotation, the cumulative effect of which can be controlled or minimized in the interest of a more efficient operation by maintaining rotation in one direction. Unidirectional rotation of the drive shaft is important to minimize wear and to prevent pumping of lubricant in the wrong direction when a helically wound flexible drive cable is employed. For example, such a cable used to drive the instrument on a steam locomotive is placed so as normally to pump lubricant upward and thus keep the cable well lubricated in its conduit. Prolonged operation in the reverse direction would tend to draw the lubricant downward in the conduit to cause the upper reaches of the cable to run dry. It is, therefore, another object of the present invention to provide means for insuring unidirectional rotation of the output spindle of the mechanism. In attaining this object I employ a frame or yoke mounted to oscillate about the axis of the input spindle, carrying two idlers meshing with the input gear and swingable, one to mesh with the output gear when the input gear rotates in one direction, and the other to mesh with the adjustable idler when rotation of the input gear is reversed. The basic directional characteristic of the arrangement is controlled by the location of the adjustable idler or idlers on one side or the other of the common center line of the input and output gears.

The gear mechanism just described may be mounted at any convenient location between the axle or friction drive and the instrument, or may be made a part of either, although unidirectional rotation of the instrument drive shaft can be effected only on the output side of the gear mechanism. By providing the mechanism with bevel gear attachments, the drive shaft may enter from and leave at various directions and angles and a greater flexibility obtained thereby.

Figure 2:
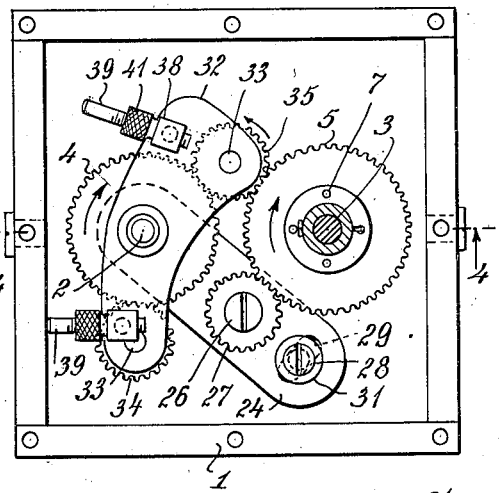
Figure 3:
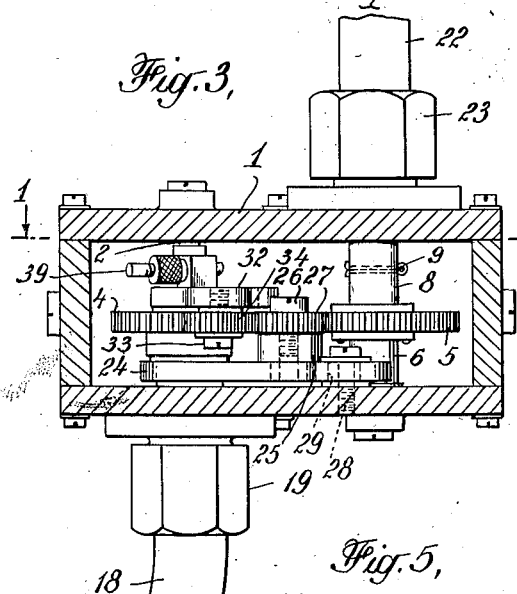
Figure 4:
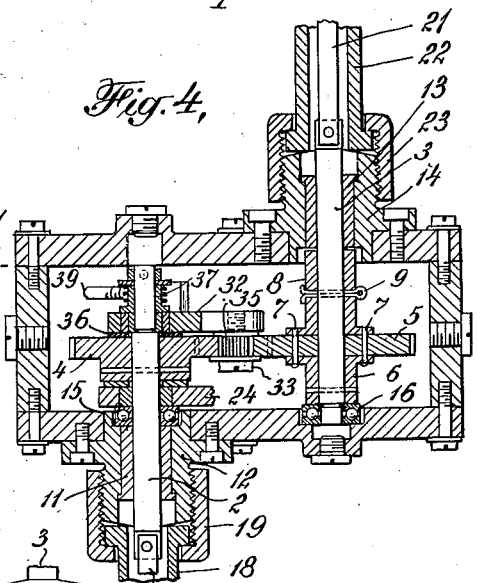
Figure 5:
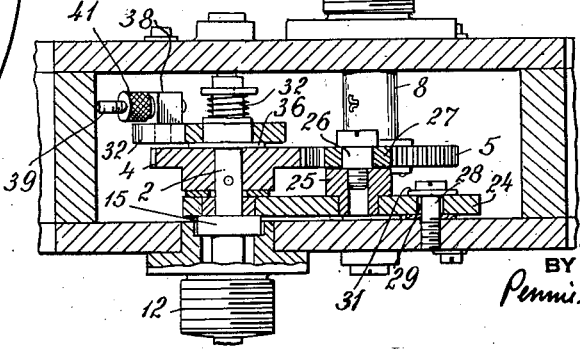
Figure 6:
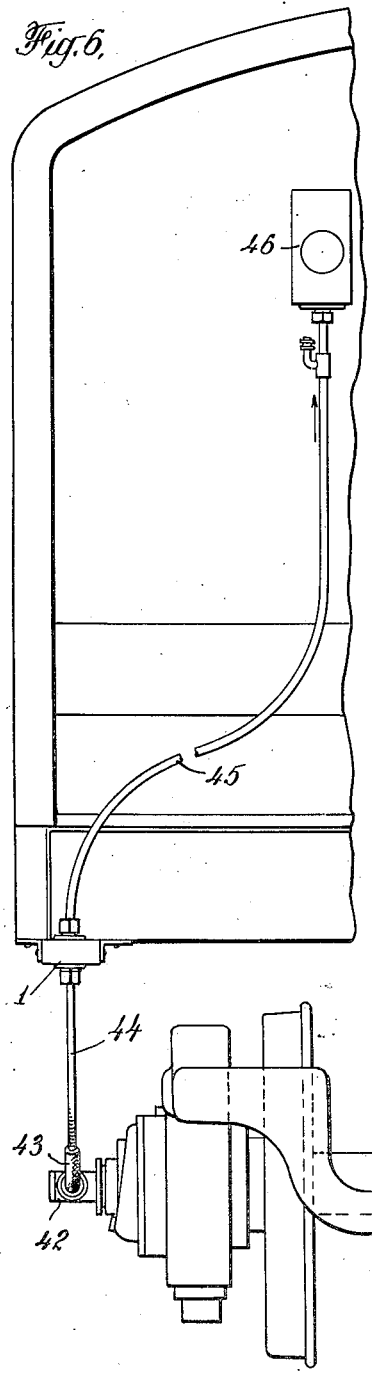
Figure 7:
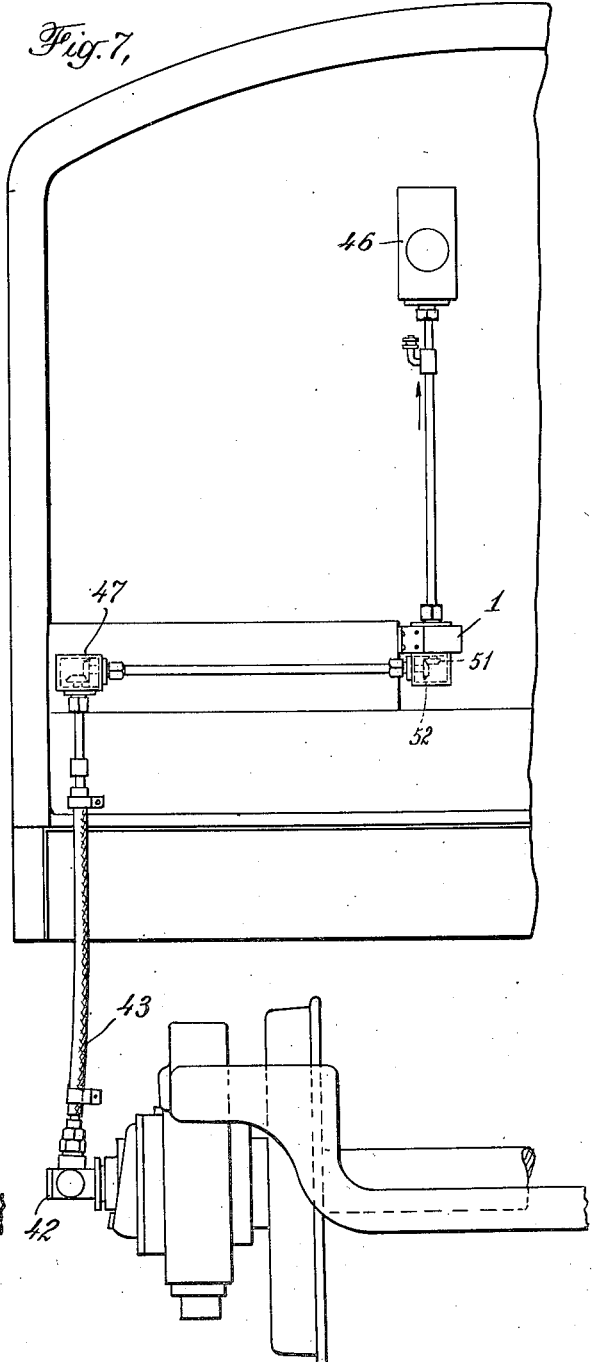

In the accompanying drawings I have illustrated preferred embodiments of the invention, showing the gear mechanism in some detail and various uses of it more or less schematically. In these drawings Figure 1 is a horizontal section through one form of the gear mechanism taken along line 1—1 of Figure 3, showing the position of the gears when the input gear is rotating counterclockwise, Figure 2 is a view similar to Figure 1 showing the position of the gears when the input gear is rotating clockwise, Figure 3 is a vertical section taken along line 3—3 of Figure 1 showing the gearing and its connections in elevation, Figure 4 is a vertical section taken along line 4—4 of Figure 2, Figure 5 is a vertical section taken along line 5—5 of Figure 1, Figure 6 is an elevation showing the gear mechanism used in connection with a speedometer driven from the axle of a Diesel-electric locomotive driver, Figure 7 is a view similar to Figure 6, but showing the gear mechanism in a different position, Figure 8 is a detail showing the gear mechanism in still another position in an axle drive connection, Figure 9 is an elevation showing the gear mechanism used in connection with a speedometer driven from the tread of a steam engine driver through a friction drive wheel, and Figure 10 is a detail showing a bevel gear conconnection for the intake spindle.

The gear mechanism illustrated in these drawings comprises a casing 1 provided with an input spindle 2 and an output spindle 3 on which are respectively mounted input gear 4 and output gear 5. The input gear 4 is fixed to the input spindle 2, but the output gear 5, though fixed to the output spindle 3 when in use, is removably mounted thereon. A flanged sleeve 6, fixed to the lower end of the spindle 3, is provided with four equi-spaced pins 7 extending upward from the flange. These pins pass through corresponding holes in the gear 5 and also through similar holes in the flange of a second sleeve 8 overlying the gear 5 and held in place on the spindle 3 by means of a cotter pin 9. The spindle 2 is journalled in a bushing 11 in a flanged and threaded boss 12 bolted to the underside of the casing 1, while the spindle 3 is journalled in a similar bushing 13 in a similar flanged and threaded boss 14 bolted to the cover of the casing. Both spindles are provided with thrust bearings, 15 and 16 respectively.

A flexible shaft 17 is bolted to the lower end of the spindle 2. This shaft is housed within a conduit 18 which is coupled to the boss 12 by means of a threaded coupling nut 19. A similar flexible shaft 21 is bolted to the upper end of the spindle 3 and it too is housed within a conduit 22 connected to its boss 14 by means of a coupling nut 23.

An arm 24 pivoted for limited movement about spindle 2, is provided near its outer end with a knob 25 carrying an idler stud 26 on which is journalled an adjustable idler gear 27 which meshes with the output gear 5. In order to hold the idler in mesh with the output gear, a clamping screw 28 is provided. This screw extends through a slot or enlarged opening 29 in the arm 24 and into the bottom of the casing. A washer 31 lies between the head of the screw 28 and the arm 24 so that the latter may be clamped and held in position by tightening the screw.

Mounted for limited oscillation about the spindle 2, and above the input gear 4, is a reversing frame 32 from both ends of which depend studs 33 on which are journalled idler gears 34 and 35 both meshing at all times with the input gear 4. The idler 34 may also mesh with the idler 27, as shown in Figure 1, and the idler 35 may also mesh with the output gear 5, as shown in Figure 2.

Interposed between the upper face of the gear 4, and the lower face of the reversing frame 32 is a friction washer 36 against which the frame 32 is lightly pressed by means of a spring collar 37 mounted upon the upper end of the spindle. The friction caused by the light spring pressure is sufficient to swing the frame 32 in the direction of rotation of the gear 4 without acting as a drag on the mechanism. Thus, when gear 4 is rotating counterclockwise, as shown in Figure 1, the idler 34 is swung into mesh with the idler 27, and when the gear 4 is rotating clockwise, the idler 35 is swung into mesh with the output gear 5, as shown in Figure 2.

In order to prevent the idlers 34 and 27 and the idler 35 and the gear 5 from bottoming when swung into mesh, as described above, the reversing frame is provided with a pair of stops, one mounted near each end. Each of these comprises a block 38 carrying a threaded pin 39 locked in position by means of a knurled nut 41. The upper pin 39 abuts against the end wall of the casing when the idlers 34 and 27 are in proper mesh, while the lower pin 39 performs the same office with respect to idler 35 and gear 5.

In order to remove the gear 5 and substitute one of different size to compensate for wear, proceed as follows: Uncouple the conduit 22 from the box by unscrewing the nut 23, disconnect the shaft 21 from the spindle 3, then remove the cover of the casing. When this has been done, remove the cotter pin 9 from the sleeve 8 and slide the sleeve and the gear 5 off the spindle. Then unloosen clamping screw 28 and swing the arm 24 so as to move the idler 27 out of mesh with gear 5. A new gear is thereupon placed on the spindle, located by means of the pins 7, the sleeve and cotter pin replaced, and the parts reassembled. When gear 5 has been replaced by another output gear of different size, it is necessary to reset idler 27 by swinging arm 24 so as to bring the idler into proper mesh with the new gear; whereupon the screw 28 is tightened to hold the arm 24 in its new position. This means, of course, that the amplitude of oscillation of reversing frame 32 and its idlers 34 and 35 is also changed, and in order to insure proper meshing of those idlers with reset adjustable idler 27 and new gear 5, it is necessary to adjust the stop pins 39.

In Figures 6, 7, and 8, I have illustrated, more or less schematically, the use of the gear mechanism in connection with the axle drive of a Diesel-electric locomotive. In Figure 6 the gear mechanism is shown mounted on the frame of the locomotive, just above the wheels. It is connected to the usual axle drive 42 by means of a chain or cable passing through the usual flexible hose connection 43, directly attached to the axle drive 42, and a curved metal conduit 44. A flexible shaft housed within a curved metal conduit 45 extends from the gear mechanism to the instrument 46. In Figure 7, a somewhat similar arrangement is shown. The flexible hose connection 43 extends vertically from the axle drive to a directional gear box 47 comprising two meshing bevelled gears. Thence the shaft extends horizontally to another and similar directional gear box mounted on the lower face of the casing of the gear mechanism of the present invention. Within this gear box are mounted a pair of bevelled gears 51 and 52, the former mounted on the input spindle of the gear mechanism and the latter on the output end of a horizontal shaft. By means of an attachment of this character, the flexibility of the gear mechanism may be increased. It may be mounted at almost any place on the locomotive and in almost any position, and still serve its function.

In Figure 8 the gear mechanism is hung at an angle just beyond the axle drive 42.

The drive illustrated in Figure 9 is a friction drive of the Wallbillich type in which a friction drive wheel 48 is held in engagement with the tread of a locomotive driver 49. The gear mechanism of the present invention is mounted just beyond the friction drive wheel and transmits power to the instrument 46 through the usual flexible shaft.

In Figure 10, I have illustrated a slightly modified form of the directional gear box shown in Figure 7.

Locomotive speedometers are calibrated on the assumption that the driving shaft rotates a definite and constant number of times per mile of track traversed. Assuming 400 rotations per mile, this turns out to be the number of revolutions per mile made by a 50 inch wheel (approximately). Thus a direct connection between the axle of such a wheel and the driving shaft of the speedometer would result in accurate readings of the instrument. As a matter of fact, however, 50 inch wheels are seldom used on Diesel locomotives, 36 and 40 inch wheels being more common.

The axle drive 42 (Figures 6 and 7) comprises two meshing bevel gears, one on an extension of the axle, and one on the end of the flexible drive shaft. Let us assume that for a 36 inch wheel the ratio of these gears is 21 to 30; for a 40 inch wheel, 21 to 27.

These gear ratios reduce the number of rotations of the flexible drive shaft per mile to the number of revolutions per mile of a 50 inch wheel. In other words, a 1 to 1 bevel gear ratio used on a 50 inch wheel would produce the same number of rotations of the drive shaft as the ratios specified for a 36 inch and a 40 inch wheel respectively.

Let us assume a 1 to 1 bevel gear ratio with a 50 inch wheel or its equivalent. Then the ideal situation would require a 1 to 1 ratio between the input and output gears 4 and 5 respectively, of my gear mechanism; if the input gear had 50 teeth, the output gear would likewise have 50 teeth. However, the ideal situation cannot long endure because of wheel wear. Therefore, I choose an input gear, the teeth of which correspond in number to the average diameter in inches of the locomotive driving wheel. As a 50 inch wheel wears down to 46 inches, I choose an input gear having 48 teeth. With this I use a series of six output gears ranging from 47 to 52 teeth.

Let us assume a 1 to 1 bevel gear ratio with a 36 inch wheel. Then the ideal situation would require a 36 to 50 ratio between the input and output gears of my mechanism. But to compensate for wheel wear I choose an input gear of 34 teeth and the same series of output gears ranging from 47 to 52 teeth. Similarly with a 40 inch wheel the input gear would have 36 teeth and the same series of output gears would be used.

The input gear has two teeth less than the new or rated diameter in inches of the locomotive driving wheel, but the same series of output gears is always used. The 47-tooth wheel is included in the series because new car wheels are usually slightly larger than the rated diameter. The series of gears gives an overall corrected range of approximately 2 per cent in each step, or plus or minus 1 per cent.

In the case of a friction drive, reducing gearing is used to reduce the number of rotations of the flexible shaft. These may be brought down to the rotations of a locomotive wheel of any given size and the input gear of my mechanism selected accordingly. As in the case of an axle drive, the same series of output gears may be used.

It would, of course, be possible to compensate for wear by changing one or the other of the axle drive bevel gears, but this would involve shifting the axis of the flexible shaft gear and is not feasible; nor would it be feasible to obtain by this means the quick and accurate compensation for wear afforded by my mechanism. By means of my gear mechanism I can easily and quickly compensate for wear of the locomotive wheels where an axle drive is employed by making the adjustments previously described; in the same way I can compensate for the lesser wear of the friction drive wheel operating on the tread of a driver. I can also insure unidirectional operation of the flexible shaft between the mechanism and the instrument, as well as insuring unidirectional operation of the instrument itself and its centrifugal governor. Moreover, by locating my mechanism almost anywhere between the axle or friction wheel and the instrument I am able to eliminate long and awkward curves in the flexible shaft conduit and thus improve the general efficiency of the drive.

I claim:

Driving mechanism for a locomotive speedometer, which comprises a shaft rotated with a wheel of the locomotive, an input gear driven by the shaft, the gear having two less teeth than the diameter of said wheel measured in inches, a removable output gear connected to the speedometer and adapted to be replaced by any one of a series of gears having numbers of teeth differing by one, a spindle on which the output gear is mounted, a removable bearing for one end of the spindle, the output gear being removable off the end of the spindle when said bearing is removed, and means for operatively connecting the input gear with an output gear on the spindle, said means including an arm mounted to swing about the axis of rotation of the input gear, an idler gear carried by the arm and engageable with the output gear, and means for securing the arm in different angular positions and with its idler engaged with the driven gear, regardless of the size of the latter.

WM. BELL WAIT.

(References on following page)

REFERENCES CITED

The following references are of record in the file of this patent:

UNITED STATES PATENTS

| Number | Name | Date |
|---|---|---|
| 606,258 | Whiting | June 28, 1898 |
| 633,385 | Mann | Aug. 19, 1899 |
| 921,593 | Collier | May 11, 1909 |
| 975,748 | Carroll | Nov. 15, 1910 |
| 1,178,078 | Kocourek | Apr. 4, 1916 |
| 1,380,953 | Hagaman | June 7, 1921 |
| 1,460,523 | Whittington | July 3, 1923 |
| 1,463,919 | Clingman | Aug. 7, 1923 |
| 1,526,333 | Gilbert | Feb. 17, 1925 |
| 1,736,064 | Walker | Nov. 19, 1929 |
| 1,824,670 | Juneau | Sept. 22, 1931 |
| 1,919,512 | Helgeby | July 25, 1933 |
| 2,094,669 | Pratt | Oct. 5, 1937 |
| 2,147,027 | Grier | Feb. 14, 1939 |
| 2,210,154 | Stevens | Aug. 6, 1940 |
| 2,297,422 | Mobius | Sept. 29, 1942 |
| 2,426,299 | Dyer | Aug. 26, 1947 |
| 2,431,149 | Sylvander | Nov. 18, 1947 |
| 2,436,746 | Drought | Feb. 24, 1948 |

Certificate of Correction

May 2, 1950

Patent No. 2,506,562 WILLIAM BELL WAIT

It is hereby certified that error appears in the printed specification of the above numbered patent requiring correction as follows:

Column 6, line 8, for "36 teeth" read *38 teeth*;

and that the said Letters Patent should be read with this correction therein that the same may conform to the record of the case in the Patent Office.

Signed and sealed this 18th day of July, A. D. 1950.

[SEAL]

JOE E. DANIELS,
*Assistant Commissioner of Patents.*